G. COOK.
DRIVE GEAR FOR AUTOMOBILES.
APPLICATION FILED APR. 13, 1915.

1,175,128. Patented Mar. 14, 1916.
2 SHEETS—SHEET 1.

WITNESSES:
Howard D. Orr.
F. T. Chapman

George Cook,
INVENTOR,
BY E. G. Siggers
Attorney

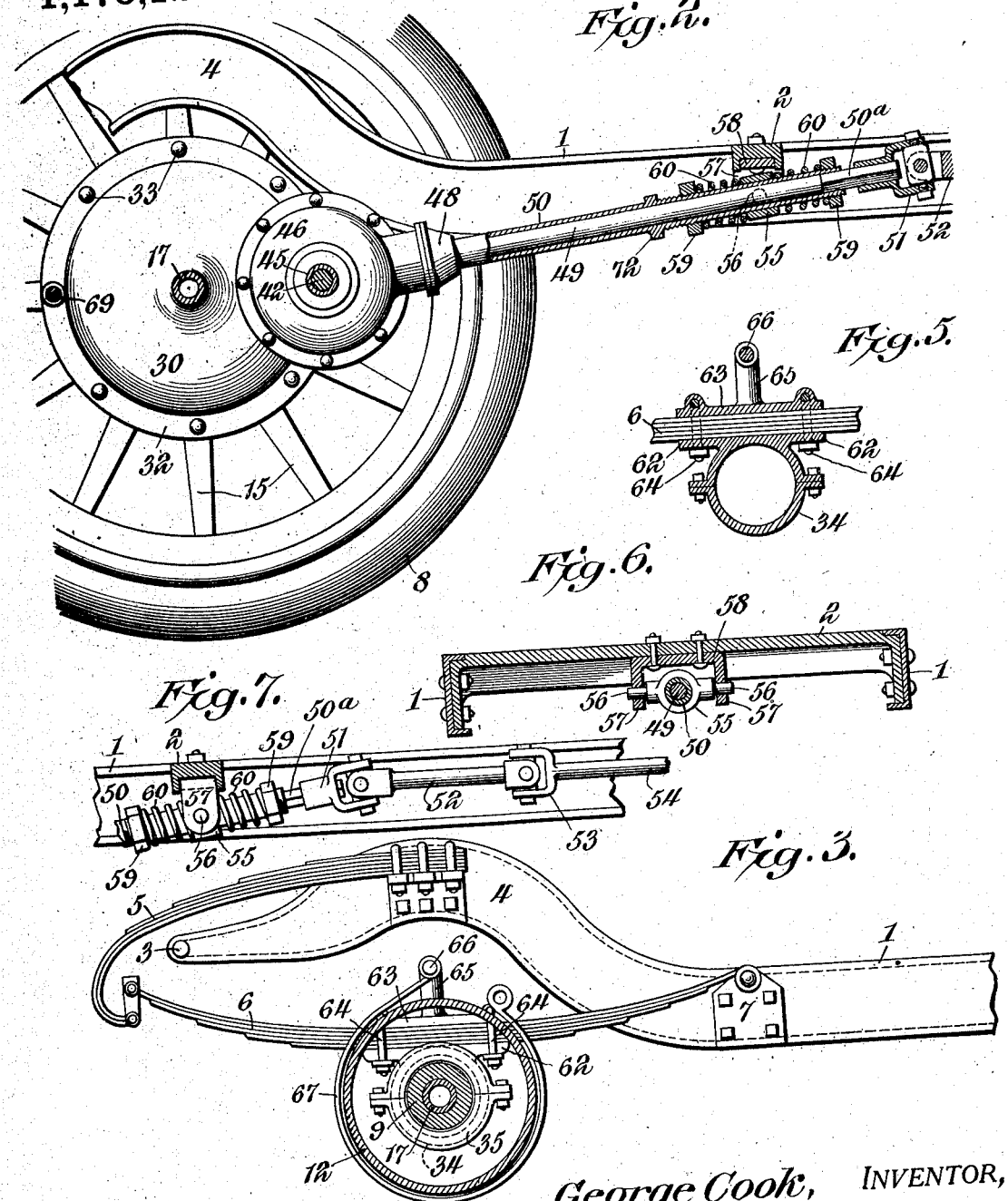

UNITED STATES PATENT OFFICE.

GEORGE COOK, OF ELBA, NEW YORK.

DRIVE-GEAR FOR AUTOMOBILES.

1,175,128.   Specification of Letters Patent.   Patented Mar. 14, 1916.

Application filed April 13, 1915. Serial No. 21,110.

*To all whom it may concern:*

Be it known that I, GEORGE COOK, a citizen of the United States, residing at Elba, in the county of Genesee and State of New York, have invented a new and useful Drive-Gear for Automobiles, of which the following is a specification.

This invention has reference to drive gear for automobiles, and its object is to provide a drive gear wherein the driving power is conveyed to the drive wheels in a manner to equally distribute the driving power, and also to so arrange the parts that the liability of access of dust or other deleterious matter is practically prevented.

The invention comprises spaced driving gear connected to the wheel hubs, the latter being elongated sufficiently to permit the location of the drive gear within the space between the side bars of the vehicle frame. The elongated hubs provide space for brake drums and for the attachment of the springs, both outside of the side bars of the vehicle frame, and the driving gear includes a counter shaft so arranged that supplemental brake drums may be applied to the counter shaft.

The invention also includes various features of construction and arrangement of parts which will appear farther on.

The invention will be best understood from a consideration of the following detailed description taken in connection with the drawings forming a part of this specification, with the understanding that while the drawings show a practical embodiment of the invention, the latter is susceptible of various changes and modifications, so long as such changes mark no material departure from the salient features of the invention.

Figure 1:
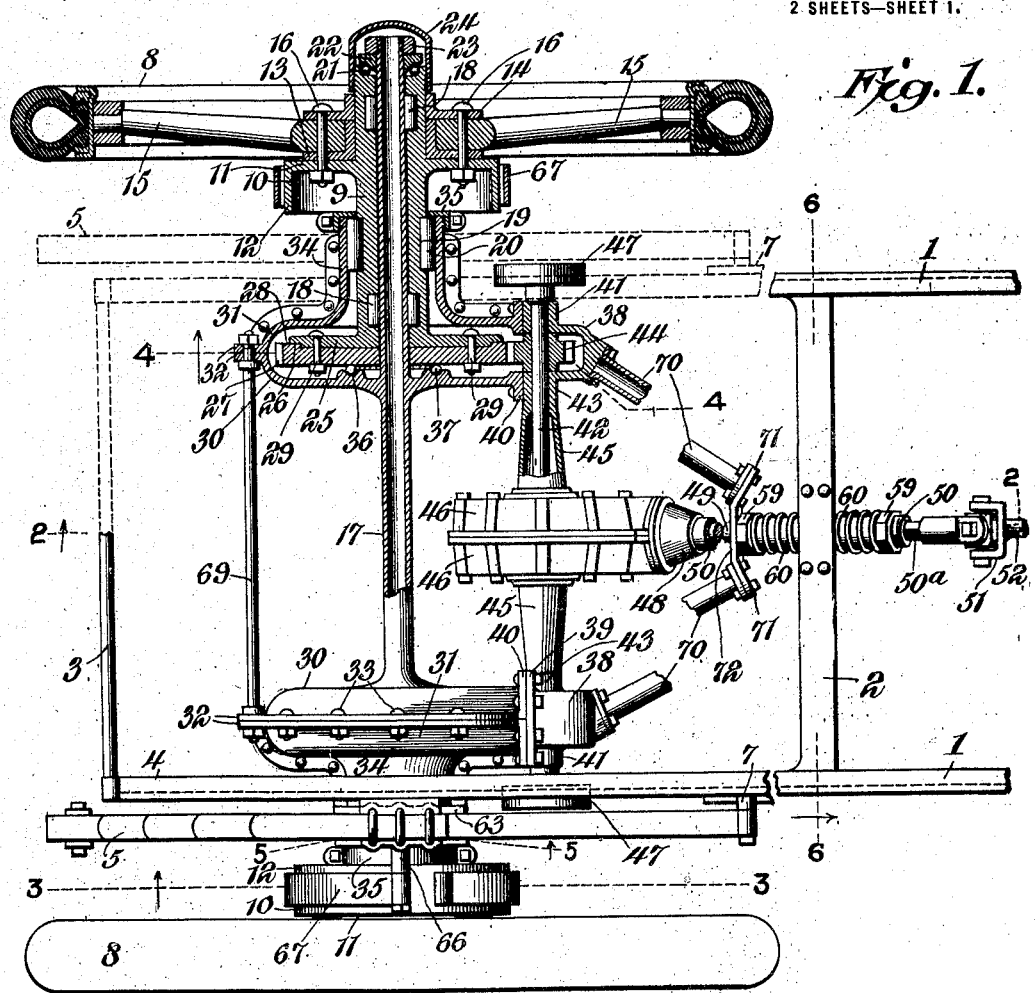
Figure 4:
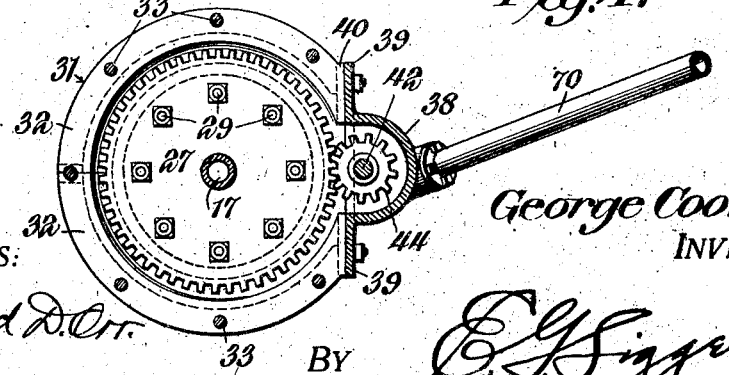

In the drawings: Figure 1 is a plan view with some parts in section of drive gearing embodying the invention, and also showing portions of the vehicle frame. Fig. 2 is a section on the line 2—2 of Fig. 1, some parts being shown in elevation. Fig. 3 is a section on the line 3—3 of Fig. 1. Fig. 4 is a section on the line 4—4 of Fig. 1 with distant parts omitted and some parts nearer to the observer than the plane of the section shown in elevation. Fig. 5 is a section on the line 5—5 of Fig. 1 with distant parts omitted. Fig. 6 is a section on the line 6—6 of Fig. 1 also omitting distant parts. Fig. 7 is a sectional view constituting a continuation of the right-hand end of Fig. 2.

Referring to the drawings, there is shown a portion of a vehicle frame having side bars 1, usually constructed of channel metal, and so shown in the drawings, although of course the frame may be otherwise constructed. Connecting the side bars at one point is a cross bar 2, and at another point, corresponding to the rear end of the vehicle, the side bars 1 are connected by another cross bar 3. Between the bars 2 and 3, the side bars 1, in the particular construction shown, are suitably bent, so that the rear portion of each side bar has an upward bend whereby the said rear portion indicated at 4 is suitably elevated above the level of the main portions of the side bars 1.

Attached to the elevated portion 4 of each side bar is a spring element 5, which in turn is connected to the side bar 1 by means of a bracket 7 or in any other suitable manner. The invention has nothing to do with the particular type of spring, and so it will be understood that any suitable form of spring may be employed.

In the drawings are shown wheels 8, which in their general construction may follow the conventional forms employed in automobiles. The wheels each have an axially elongated hub 9, on which they are secured. Each hub adjacent to the wheel thereon is formed with a brake drum 10 comprising a radial flange 11 and an overhanging marginal flange 12. The flange 11 provides an abutment for a circular angle member 13 having a web surrounding the hub 9, and a ring-shaped face plate 14 between which and the angle 13 the spokes of the wheel indicated at 15 are mounted. Bolts 16 or other fastening devices serve to clamp the spokes in place and to hold the member 13 and face plate to the brake drum 10. Each hub 9 is mounted upon a corresponding end of an axle 17, which in the particular showing of the drawings is a hollow or tubular axle, but it will be understood that a solid axle may be used if desired. The length of each hub 9 is such that the respective wheel and the brake drum are both outside of the corresponding side bar 1 of the frame, while the other end of the hub extends to the interior of the vehicle frame between the side bars 1.

The hub is sufficiently long to permit the employment of ordinary roller bearings 18 between the axle 7 and the hub 9, near the respective ends of the hub, thus avoiding material side play of the hub in the event of wearing of the bearings. The greatly elongated hub, by making it feasible to employ ordinary roller bearings, does away with the necessity of special types of roller bearings demanded by wheel hubs as ordinarily constructed in connection with automobile wheels.

Each hub 9, between the roller bearings, the hub being hollowed out for the accommodation of the bearings, 18, is provided with an axially elongated external groove or channel 19 for the reception of roller bearings 20, to which reference will hereinafter be made. The outer end of each hub is formed with a ball race for anti-friction balls 21, and these balls are held in place by a cone 22 and nut 23, the latter being housed by a cap nut 24 applied to the outer end of the hub.

That end of the hub remote from the nut 23 is formed into a radial flange 25 having a plane face on the side remote from the hub 9, and said face has a marginal rabbet 26. Applied to the rabbeted face of the flange 25 is a gear wheel 27 having a marginal rib 28 adapted to the rabbet 26. Bolts 29 or other fastening device serve to hold the gear wheel 27 to the flange 25, the rabbet 26 and rib 28 accurately centering the gear wheel.

Formed on the axle 17 at equal distance from the mid point of the axle are casing members 30, each member being preferably integral with the axle and of an internal diameter greater than the exterior diameter of the gear wheel 27. Secured to the marginal portion of each casing member 30 is another casing member 31 formed of two half members provided with branching flanges 32 by means of which the two half members are secured together by bolts 33 or otherwise. The casing member 31 has an axially extended tubular prolongation 34 of a size to receive the corresponding part of the hub 9 and to inclose the rollers 20, holding them in the channel 19. A dust cap 35 applied to that end of the tubular extension 34 remote from the casing member 31 serves to protect the rollers 20 and the interior of the casing from access of dust and also the parts are so constructed that the casing will retain lubricant without leakage. The outer wall of the casing 30 is provided with ball races 36 containing anti-friction balls 37 bearing against that face of the gear wheel 27 remote from the flange 25 and acting in opposition to the ball bearings 21. The two ball bearings 21 and 37 take up all end thrust, and maintain the axle in proper position with a minimum of friction.

The casing members 30 and 31 are cut off on one side along a chord, and to this chord portion there is secured a hollow cap 38, the cap being suitably flanged as shown at 39, and abutting like flanges 40 of the casing members 30 and 31, respectively. At one side the casing member 38 is formed with a bearing 41 for a counter shaft section 42, and on the other side the casing 38 is formed with another bearing 43 for the counter shaft section 42. Within the cap 38 the shaft section 42 carries a pinion 44 fast thereto and in mesh with the gear wheel 27.

The structure includes two hubs 9 and two casings 30 and 31 in spaced relation, and each casing has a cap 38. The member 43 of each cap has an axial prolongation 45 terminating in a half casing 46, said casing members 46 joining at the longitudinal mid line of the vehicle, and such casing incloses a differential gearing which may follow the usual lines of differential gearing, therefore, no attempt is made to illustrate it. Each counter shaft section 42 is extended outwardly beyond the bearing 41, and there carries a brake drum 47 which may be employed as supplemental to the brake drums 10.

The casing 46 carries a bearing 48 for a drive shaft 49 extending through a tubular casing 50 fast to the bearing 48 and continued forwardly toward the customary location of the driving engine. The shaft 49 terminates at the end remote from the bearing 48 in a squared end 50ª or other non-circular extension entering and bearing in a knuckle or universal connection 51 to a drive shaft section 52 in turn having a knuckle connection 53 to the main drive shaft 54 of the engine.

The casing 49 is slidably mounted in a sleeve 55 having trunnions 56 at opposite sides mounted in gears 57 of a bracket 58, which latter is made fast to the cross beam 2 at a point about midway of its length.

Applied to the casing 50, which is appropriately threaded for the purpose, are nuts 59 located on opposite sides of the sleeve 55, and between the nuts 59 and the sleeve 55 the casing 50 is surrounded by helical springs 60.

The bracket 58 has the sleeve 55 located therein in accordance with the degree of inclination of the casing 50 and shaft 49. If the power shaft 54 be located at a certain height, and the counter shaft 42 be located at about the same height as the axle 17, the shaft 49 and casing 50 will have a certain degree of inclination. This may be eliminated by locating the counter shaft 42 at a higher point than illustrated in the drawings, in which case the inclination of the shaft 49 and casing 50 is correspondingly less and the transmission of power is more nearly in a direct line from the engine to the differential gearing within the casing 46.

Each extension 34, where surrounding the bearing rollers 20, is formed with oppositely directed tangential flanges 62 constituting a plate which receives the corresponding spring 6. On the opposite face of the spring 6 there is applied another plate 63 connected to the collar 6 by U-bolts 64, as is customary in spring-fastening structures.

Located on the plate 63 is a post 65 terminating in an overhanging portion 66 designed to receive one end of a brake strap 67 encircling the respective brake drum 10, while the other end of the brake strap is appropriately formed for the reception of manipulating means.

Those portions of the casings 30 and 31 remote from the cap 38 are joined by a connecting rod 69. Extending from each cap 38 toward the casing 50 is a brace member 70, which may be of tubular form, as shown, or may be otherwise constructed, each brace 70, at the end remote from the respective cap 38, is made fast at the end remote from the cap to a lug 71 of a clip 72 fast to the casing 50, between the bearing 48 and the adjacent nut 59.

The casings 30 and 31, with the caps 38 and the extensions 45, together with the differential casing 46, form receptacles for lubricant, so that moving parts are at all times maintained in well-lubricated condition.

The power applied to the shaft 54 causes a rotation of the shaft member 52, and the shaft 49 through the knuckle joints 53 and 51, and this power is transmitted through the usual differential gearing housed in the casing 46 through the counter shaft 42 and from the latter by the pinions 44 to the gear wheels 27, which gear wheels, being fast to the respective hubs 9, produce rotation of the drive wheels 8.

The casings 30 and 31 inclosing the respective gear wheels 27 are located in the space between the side bars 1 and hence are supported quite a distance from the driving wheels, so that mud and dust lifted by the drive wheels and thrown about by said drive wheels are not liable to reach the casings. Even if some such deleterious matter should reach the casings, access to the casings is prevented by very tight construction, such inaccessibility being very difficult if not impossible of accomplishment where the gear wheels are made fast to the hubs closely adjacent to the driving wheels. Moreover, the axial prolongation of the hubs, which prolongation is much in excess of the usual lengths of the hubs, permits the employment of axially separated bearings, so that ordinary roller bearings may be employed instead of much more expensive special bearings.

The prolongation of the casing members 31 in the form of a neck 34 provides for the support of the springs upon such casings, so that the weight of the vehicle upon the springs is sustained by the bearings 20 interior to the casing neck or extension 34 at the point where the springs are supported.

The construction not only provides for the brake drums 10, but the latter, being in one piece with the hubs, permit the direct securing of the wheels to the brake drums and by the brake drums to the hubs.

The axle may be a one-piece structure throughout its length, thus contributing to its strength to an extent, making the axle stronger for the same amount of material than is the case with divided axles. Moreover, the axle serves as a connecting member, and has the support for the casings inclosing the gearing, and such casings are made specially rigid by the connecting bar or rod 69 and the brace rods 70.

Variations in position of the frame with respect to the drive wheels and to the drive shaft is compensated by the rocking support represented by the sleeve 55, while longitudinal movements of the casing 50 with respect to the driving shaft and the vehicle frame are eased and taken up by the springs 60, which latter serve to centralize the casing 50 lengthwise of the vehicle. Moreover, by disconnecting the springs from the hub casings, and disconnecting the shaft 49 from the engine shaft, the whole rear wheel structure may be readily removed from the vehicle for inspection or repair or for any other purpose. The brace rods 70 in no wise interfere with rising and falling of the casing 50, but serve to steady the gear casings 30 and 31, and the axle 17 and wheels 8, against twisting or side movements. While the structure of the present invention is particularly adapted for use in connection with automobiles, and has been so described, it will be understood that the invention either in whole or in part may be used wherever advantageous, and the term automobile as used in the claims is to be understood as covering any appropriate vehicle.

While the casing members 30 are shown as in one piece with the axle 17, it will be understood that the benefits of such construction may be accomplished by shrinking said casing members on the axle.

While it has been stated that the differential gearing employed is of customary construction, it will be understood that because of the introduction of the gearing between the counter shaft and the hub, the direction of transmission of motion through the differential gearing must be reverse from the direction of motion in structures where the differential gearing is mounted directly on the axle.

What is claimed is:

1. In drive gearing for automobiles a non-rotatable axle with spaced casings thereon, elongated hubs at opposite ends of the axle and projecting from and in part housed in the casings, gearing also housed in the casings and connected to the respective hubs, a counter shaft connecting the gearing, a casing for the counter shaft extending between and fast to the first-named spaced casings, and a drive shaft coupled to the counter shaft, said countershaft and casing therefor being on the same side of the axle as the drive shaft.

2. In drive gearing for automobiles, a non-rotatable axle with spaced casings thereon, elongated hubs at opposite ends of the axle projecting from and in part housed in the casings, and each provided with a brake drum exterior to the casing and a wheel exterior to the drum, gearing also housed in the casings and connected to the respective hubs, and driving means connected to the gearing, the elongation of the hubs being such as to locate the drums exterior to the vehicle frame and the casings interior to the sides thereof.

3. In drive gearing for automobiles, a non-rotatable axle with spaced casings thereon, elongated hubs at opposite ends of the axle and projecting from and in part housed in the casings, and said hubs having wheels mounted thereon exterior to said casings, gearing also housed in the casings and connected to the respective hubs, a drive shaft having an intermediately located support and connected to the gearing, and equalizer springs on opposite sides of said support.

4. In drive gearing for automobiles, a non-rotatable axle with spaced casings thereon, elongated hubs at opposite ends of the axle and projecting from and in part housed in the casings, said hubs exterior to the casings having wheels mounted thereon, gearing also housed in the casing and connected to the respective hubs, a drive shaft having an intermediately located support and connected to the gearing, and support and connected to the gearing, and equalizer springs on opposite sides of said support, said intermediately located support being mounted for rocking movements on an axis transverse of the length of the shaft.

5. In drive gearing for automobiles, elongated hubs, each with a radial flange at one end and the brake drum near the other end, said hubs being each of a length to locate the flanges between the sides of the automobile frame and the brake drums exterior to the sides of the automobile frame, an axle of a length to carry both hubs, spaced casings on the axle housing respective flanges and the portions of the hubs between the flanges and brake drums, and roller bearings between each hub and the axle within the confines of the casing and beyond that side of the brake drums toward said casing.

6. In drive gearing for automobiles, elongated hubs each with driving gears connected to one end and near the other end provided with a brake drum, a casing for the gears and a portion of the hub adjacent thereto, said casing having an axially extended continuation toward the brake drum, and a spring-holding clip mounted on the axially extended portion of the casing adjacent to the brake drum.

7. In drive gearing for automobiles, elongated hubs each with driving gears connected to one end and near the other end provided with a brake drum, a casing for the gears and a portion of the hub adjacent thereto, said casing having an axially extended continuation toward the brake drum, a spring-holding clip mounted on the axially extended portion of the casing adjacent to the brake drum, and roller bearings between the hub and casing extension, where the latter is surmounted by the clip.

8. In drive gearing for automobiles, a non-rotatable axle having casings thereon, elongated hubs mounted on the axle and in part inclosed by the casings, and each carrying a wheel exterior to the respective casing, gearing housed in the casings and connected to the respective hubs, a counter shaft connecting the gearing, a casing housing the counter shaft and connecting corresponding portions of the first-named casings, a drive shaft connected to the counter shaft, a casing for the drive shaft, a rockable support for the drive shaft casing located between the ends of the drive shaft, equalizer springs on the drive shaft casing on opposite sides of the rockable support, and braces extending from the first-named casings to the rock shaft casing and connected to both.

In testimony that I claim the foregoing as my own, I have hereto affixed my signature in the presence of two witnesses.

GEORGE COOK.

Witnesses:
 DAVID H. WAGNER,
 F. T. CHAPMAN.